2 Sheets--Sheet 2.

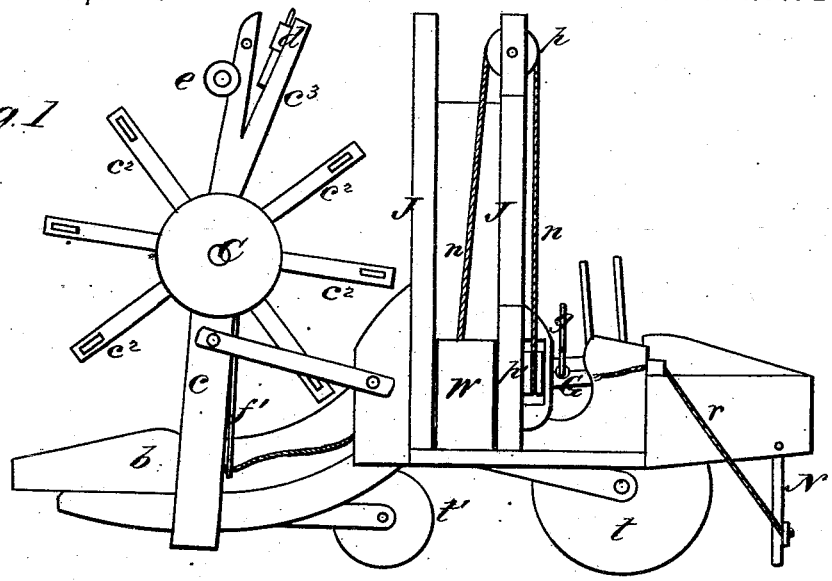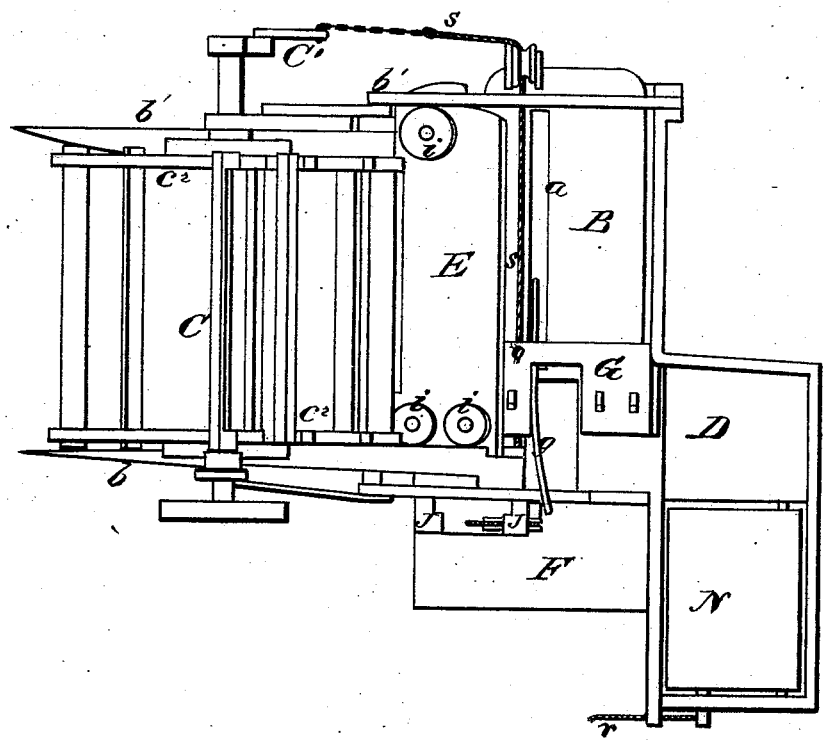

A. GRAY.
Harvesters.

No. 157,127.

Patented Nov. 24, 1874.

WITNESSES
E. H. Bates
Robert Everett

INVENTOR
Adam Gray
Chipman & Hosmer & Co.
ATTORNEYS

UNITED STATES PATENT OFFICE.

ADAM GRAY, OF OSAGE, IOWA.

IMPROVEMENT IN HARVESTERS.

Specification forming part of Letters Patent No. 157,127, dated November 24, 1874; application filed September 26, 1874.

*To all whom it may concern:*

Be it known that I, ADAM GRAY, of Osage, in the county of Mitchell and State of Iowa, have invented a new and valuable Improvement in Attachments for Reapers and Harvesters; and I do hereby declare that the following is a full, clear, and exact description of the construction and operation of the same, reference being had to the annexed drawings making a part of this specification, and to the letters and figures of reference marked thereon.

Figure 3:
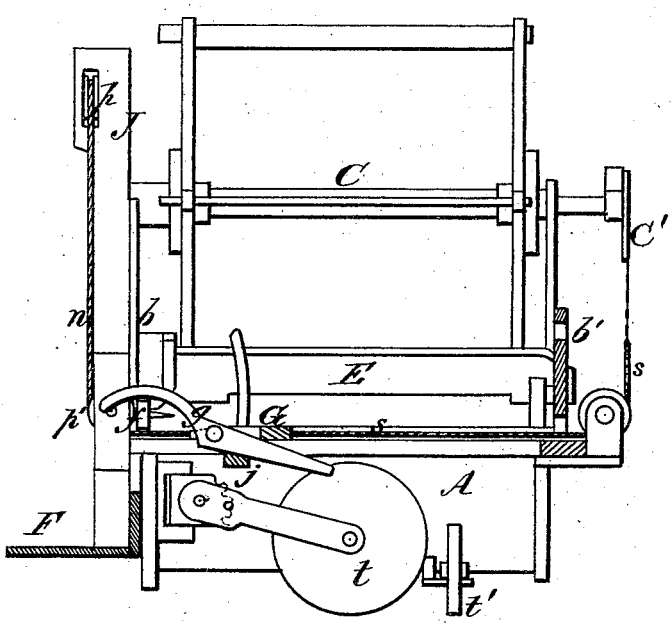
Figure 4:
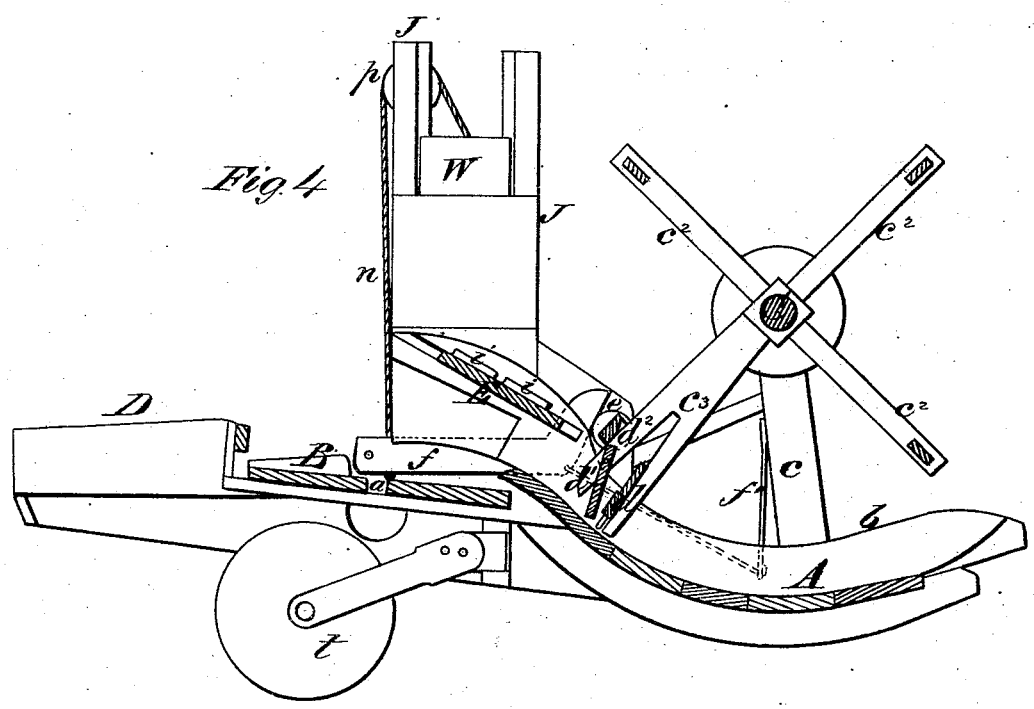

Figure 1 of the drawing is a representation of a side view of my attachment for reapers and harvesters. Fig. 2 is a top view of the same, and Fig. 3 is a transverse sectional view. Fig. 4 is a vertical sectional view.

This invention has relation to means for gathering and binding grain, wherein the work is performed by a person riding on the machine in rear of a reel and cutting apparatus. My objects are mainly to elevate the grain in gavels and deliver it upon a table, across which it is moved to the binder by an automatically-reciprocating carriage, which, with a curved arm, compresses the grain and holds it firmly while being bound, after which the bound gavels are moved backward automatically and deposited upon a receiver ready to be dropped. Another object is to combine a dropper with the bundle-receiver, having a hinged bottom, to which a rope or chain is attached leading to the driver, who can drop the bundles whenever he desires, as will be fully understood from the following description.

In the drawings I have omitted to show the draft-frame and the driving mechanism, as these parts may be of any of the well-known kinds, and the attachment of my improvements may be made to a draft-frame in any well-known manner.

A designates a grain-platform, which extends backward and upward from the sickle in a curved form, as shown in Fig. 4, and terminates at its upper end in a horizontal or nearly horizontal table, B, having a slot, $a$, through it. On the opposite sides of the concave platform A are raised grain-guards $b$ $b'$, from which rise reel-posts $c$ $c^1$, that afford bearings for a reel-shaft, C, carrying reel-arms $c^2$ $c^3$. The reel-arms $c^3$ are bifurcated, and carry a broad-toothed rake, $d$, and a blade, $d^1$, which latter is free to turn, except when one edge of it bears against a cross-bar, $d^2$, as shown in Fig. 4, when it aids the rake $d$ to press back and elevate the grain upon the table B. One end of the bar $d^2$ is elongated, and carries an anti-friction wheel, $e$, which acts against the upturned end of a bundle-mover, $f$, and presses this device backward once during each rotation of the combined rake and reel. This device $f$ works loosely in a suitable guide on the inner end of the table B, and is connected to a spring, $f'$, which retracts it after each backward stroke. It has a spur on its outer side, near its inner end, by which it gets a hold on the bundles and presses them back upon a receiving-table, D, in rear of and at the inner end of the grain-table B. E is a guard-board, which works back and forward in grooves made in the side guards $b$ $b'$, and which is prevented from binding by means of anti-friction rollers $i$ $i$ $i$. (Shown in Fig. 2.) This guard-board lies over the grain while it is being delivered upon the table B, and prevents the grain from being scattered. It is moved back by the iron-shod ends of the arms, to which the blade $d^1$ is pivoted, and it is moved forward by its own gravity. G designates a carriage, which is slotted, toothed, and provided with a pivoted hooked arm, $g$. This carriage moves the grain to the inner end of the table B in a position to be bound by a person who stands on the platform F, and when the grain has been thus moved it is compressed by means of the semicircular arm $g$, and so held until the attendant passes a band around it and fastens the band. The arm then rises, and, with the toothed carriage, is moved to the outer or grain end of the table B, ready to repeat the operation on another gavel. The arm $g$ is thrown up by the gravity of its lower end, and it is depressed at the proper times by coming in contact with a cross-bar, $j$. (Shown in Fig. 3.) On the outer end of the rake and reel shaft C is a crank-arm, C', which is connected, by a rope or chain passed under a grooved pulley, $k$, to the outer end of the carriage G, and at every revolution of the shaft C the carriage G is moved out to the grain end of the table B. Carriage G is caused to move inward for delivering the grain to the attendant by means of a weight, W, which is guided between two uprights, J, rising from the inner side of the machine, which weight is connected to the inner end of the carriage G by means of a rope or chain, $n$, passed over a pulley, $p$, and beneath a pulley, $p'$, as shown in Fig. 1. The bound grain is thrown into a receiver having a dropping bottom, N, to which a rope, $r$, is attached, that is placed in the hands of the driver, who relieves the binder of the labor of dropping the gavels. The machine above described is mounted on two caster-wheels. $t\ t'$.

What I claim as new, and desire to secure by Letters Patent, is—

1. The pivoted blade $d^1$, in combination with the rake $d$ and reel-arms $c^3$, substantially as described.

2. The sliding guard-board E, combined with rake $d$, blade $d^1$, arm $c^3$, and a grain-platform, substantially as described.

3. The crank-arm C′, ropes S $n$, carriage G, and weight W, combined and arranged substantially as described.

4. The receiver D, platform F, table B, platform A, a rake and reel, and a reciprocating carriage, G, combined and arranged substantially as described.

In testimony that I claim the above I have hereunto subscribed my name in the presence of two witnesses.

ADAM GRAY.

Witnesses:
T. C. LANGLEY,
THOS. HARRISON.